(12) United States Patent
Huang

(10) Patent No.: US 11,804,931 B2
(45) Date of Patent: Oct. 31, 2023

(54) METHOD FOR DATA TRANSMISSION BASED ON NUMBER OF RETRANSMISSION ADJUSTMENT, ELECTRONIC DEVICE, AND STORAGE MEDIUM

(71) Applicants: SHENZHEN HEYTAP TECHNOLOGY CORP., LTD., Guangdong (CN); GUANGDONG OPPO MOBILE TELECOMMUNICATIONS CORP., LTD., Guangdong (CN)

(72) Inventor: Yuan Huang, Guangdong (CN)

(73) Assignees: SHENZHEN HEYTAP TECHNOLOGY CORP., LTD., Shenzhen (CN); GUANGDONG OPPO MOBILE TELECOMMUNICATIONS CORP., LTD., Shenzhen (CN)

( * ) Notice: Subject to any disclaimer, the term of this patent is extended or adjusted under 35 U.S.C. 154(b) by 329 days.

(21) Appl. No.: 17/319,594

(22) Filed: May 13, 2021

(65) Prior Publication Data
US 2021/0266107 A1 Aug. 26, 2021

Related U.S. Application Data

(63) Continuation of application No. PCT/CN2018/115703, filed on Nov. 15, 2018.

(51) Int. Cl.
*H04L 1/1867* (2023.01)
*H04L 43/0829* (2022.01)
*H04W 84/12* (2009.01)

(52) U.S. Cl.
CPC ............ *H04L 1/189* (2013.01); *H04L 1/1896* (2013.01); *H04L 43/0829* (2013.01); *H04W 84/12* (2013.01)

(58) Field of Classification Search
CPC .................. H04L 1/189; H04L 1/1896; H04L 43/0829; H04W 84/12
See application file for complete search history.

(56) References Cited

U.S. PATENT DOCUMENTS

| | | | |
|---|---|---|---|
| 8,064,461 B2* | 11/2011 | Nishida | H04L 1/1874 714/751 |
| 8,437,284 B2* | 5/2013 | Plamondon | H04L 67/56 370/293 |
| 9,313,136 B1* | 4/2016 | Vivanco | H04L 47/283 |
| 9,444,683 B2* | 9/2016 | Kakadia | H04L 43/08 |

(Continued)

FOREIGN PATENT DOCUMENTS

| | | |
|---|---|---|
| CN | 102790666 A | 11/2012 |
| CN | 105530076 A | 4/2016 |

(Continued)

OTHER PUBLICATIONS

Chinese Second Office Action with English Translation for CN Application 201880099019.2, dated Aug. 15, 2022. (16 pages).

(Continued)

*Primary Examiner* — Christopher M Crutchfield
*Assistant Examiner* — Tito Q Pham
(74) *Attorney, Agent, or Firm* — Young Basile Hanlon & MacFarlane, P.C.

(57) ABSTRACT

A method for data transmission and related products are provided. The method includes the following. A first application data packet of a first application is obtained during running the first application. The first application data packet is tagged according to first user identification (UID) of the first application, and a first data packet tag of the first application data packet is obtained. A target PLR of data transmitted by the Wi-Fi module is obtained in response to that the first data packet tag is identified by the Wi-Fi module. When the target PLR is greater than a first threshold, first maximum number of retransmissions of the first application data packet is increased to first target number of (Continued)

retransmissions according to the target PLR. The first application data packet is transmitted according to the first target number of retransmissions.

15 Claims, 7 Drawing Sheets

(56) References Cited

U.S. PATENT DOCUMENTS

| | | | | |
|---|---|---|---|---|
| 9,979,512 | B2* | 5/2018 | Kim | H04L 1/1825 |
| 11,411,684 | B2* | 8/2022 | Lei | H04L 1/18 |
| 2005/0122901 | A1* | 6/2005 | Bonneville | H04W 48/06 |
| | | | | 370/229 |
| 2012/0243523 | A1* | 9/2012 | Liu | H04L 1/002 |
| | | | | 370/338 |
| 2014/0181324 | A1* | 6/2014 | Hsu | G06F 3/0659 |
| | | | | 710/5 |
| 2016/0036564 | A1* | 2/2016 | Krishnan | H04L 1/0041 |
| | | | | 714/748 |
| 2017/0164259 | A1* | 6/2017 | Chiu | H04W 72/542 |
| 2018/0337866 | A1* | 11/2018 | Jung | H04L 47/122 |
| 2019/0364492 | A1* | 11/2019 | Azizi | H04W 24/08 |
| 2020/0374228 | A1* | 11/2020 | Yang | H04L 45/123 |

FOREIGN PATENT DOCUMENTS

| | | |
|---|---|---|
| CN | 105721423 A | 6/2016 |
| CN | 107294661 A | 10/2017 |
| CN | 108243474 A | 7/2018 |
| CN | 108353296 A | 7/2018 |
| JP | 2008067274 A | 3/2008 |
| WO | 2011064810 A1 | 6/2011 |

OTHER PUBLICATIONS

Communication pursuant to Article 94(3) EPC for EP Application 18939810.0 dated Jan. 27, 2023. (6 pages).
Chinese Frist Office Action with English Translation for CN Application 201880099019.2 dated Mar. 24, 2022. (18 pages).
Balaaji Tirouvengadam et al., CAAHR: Content Aware Adaptive HARQ Retransmission Scheme for 4G/LTE Network, ICUFN, 2012, 456-461 pages.
Extended European Search Report for EP Application 18939810.0 dated Oct. 4, 2021. (11 pages).
International Search Report with English Translation issued in corresponding PCT/CN2018/115703 dated Aug. 6, 2019.

* cited by examiner

METHOD FOR DATA TRANSMISSION BASED ON NUMBER OF RETRANSMISSION ADJUSTMENT, ELECTRONIC DEVICE, AND STORAGE MEDIUM

CROSS-REFERENCE TO RELATED APPLICATION(S)

This application is a continuation of International Application No. PCT/CN2018/115703, filed on Nov. 15, 2018, the entire disclosure of which is hereby incorporated by reference.

TECHNICAL FIELD

This disclosure relates to the technical field of communication, and more particularly to a method for data transmission and related products.

BACKGROUND

With the popularization of electronic devices (such as mobile phones, tablet computers, etc.), the electronic device can support more and more applications and become more powerful. The electronic device develops towards diversification and individuation, and becomes an essential electronic product in users' lives.

At present, during running applications of the electronic device, data packets generated by the application generally need to be sent to other devices. For example, during running a game application of the electronic device, the electronic device needs to send game data to a game server. The electronic device first sends game data packets to an access network device, and then the access network device sends the game data packets to the game server. In the related art, it generally takes a long time for the electronic device to transmit the game data packets to the access network device, which may lead to network latency and cause lag of online gaming, thereby affecting user experience. Similarly, when the electronic device transmits data packets of other applications, instability of the wireless network may also cause the electronic device to take a long time to transmit the data packets. Therefore, how to reduce the time for the electronic device to transmit the data packets is a problem to be solved.

SUMMARY

According to a first aspect, a method for data transmission is provided. The method is applicable to an electronic device. The electronic device includes a wireless-fidelity (Wi-Fi) module. The method includes the following. A first application data packet of a first application is obtained during running the first application. The first application data packet is tagged according to first user identification (UID) of the first application, and a first data packet tag of the first application data packet is obtained. A target packet loss rate (PLR) of data transmitted by the Wi-Fi module is obtained in response to that the first data packet tag is identified by the Wi-Fi module. When the target PLR is greater than a first threshold, first maximum number of retransmissions of the first application data packet is increased to first target number of retransmissions according to the target PLR. The first application data packet is transmitted according to the first target number of retransmissions.

According to a second aspect, an electronic device is provided. The electronic device includes a processor, a memory, a wireless-fidelity (Wi-Fi) module coupled to the processor, and one or more programs. The one or more programs which, when executed by the processor, cause the processor to: obtain a first application data packet of a first application during running the first application; tag the first application data packet according to first user identification (UID) of the first application, and obtain a first data packet tag of the first application data packet; obtain a target PLR of data transmitted by the Wi-Fi module in response to that the first data packet tag is identified by the Wi-Fi module; increase first maximum number of retransmissions of the first application data packet to first target number of retransmissions according to the target PLR, in response to the target PLR being greater than a first threshold; transmit the first application data packet according to the first target number of retransmissions.

According to a third aspect, a non-transitory computer readable storage medium is provided. The non-transitory computer readable storage medium stores computer programs. The computer programs, when executed by a processor, cause the processor to: obtain a first application data packet of a first application during running the first application; tag the first application data packet according to first user identification (UID) of the first application, and obtain a first data packet tag of the first application data packet; obtain a target PLR of data transmitted by the Wi-Fi module in response to that the first data packet tag is identified by the Wi-Fi module; increase first maximum number of retransmissions of the first application data packet to first target number of retransmissions according to the target PLR, in response to the target PLR being greater than a first threshold; transmit the first application data packet according to the first target number of retransmissions.

BRIEF DESCRIPTION OF DRAWINGS

The following will give a brief description of accompanying drawings used for describing the implementations or the related art.

To describe the technical solutions of the implementations of the disclosure or the related art more clearly, the following will give a brief description of accompanying drawings used for describing the implementations or the related art. Apparently, the accompanying drawings described in the following are merely some implementations of the disclosure. Those of ordinary skill in the art can also obtain other accompanying drawings based on the accompanying drawings described below without creative efforts.

DETAILED DESCRIPTION

In order to enable those skilled in the art to better understand solutions of the disclosure, technical solutions embodied in implementations of the disclosure will be described in a clear and comprehensive manner in conjunction with the accompanying drawings. It is evident that the implementations described herein are merely some rather than all the implementations of the disclosure. All other implementations obtained by those of ordinary skill in the art based on the implementations of the disclosure without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variants thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or characteristic described in conjunction with the implementation may be contained in at least one implementation of the disclosure. The phrase appearing in various places in the specification does not necessarily refer to the same implementations, nor does it refer to an independent or alternative implementation that is mutually exclusive with other implementations. It is expressly and implicitly understood by those skilled in the art that an implementation described herein may be combined with other implementations.

The electronic devices involved in the implementations of the disclosure may include various handheld devices, vehicle-mounted devices, wearable devices, computing devices that have wireless communication functions or other processing devices connected to wireless modems, as well as various forms of user equipment (UE), mobile stations (MS), terminal devices, and the like, and the like. For convenience of description, the devices mentioned above are collectively referred to as the electronic devices.

The following will describe the implementations of the disclosure in detail.

Figure 1A:
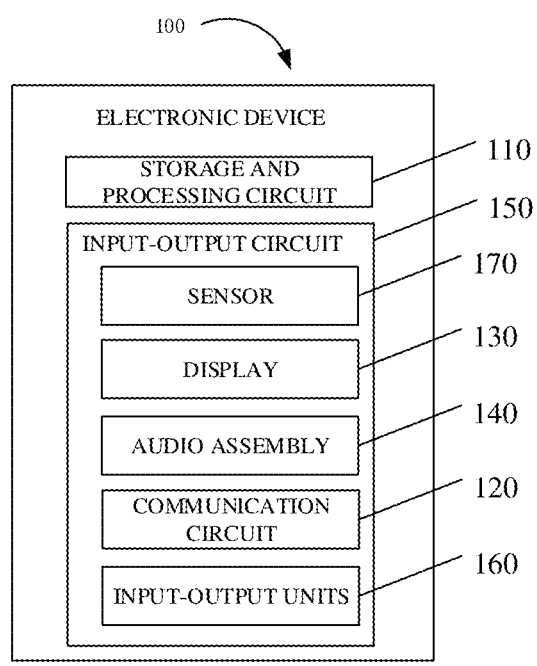
FIG. 1A is a schematic structural diagram illustrating an electronic device according to implementations of the disclosure.

FIG. 1A is a schematic structural diagram illustrating an electronic device according to implementations of the disclosure. As illustrated in FIG. 1A, the electronic device 100 includes a control circuit. The control circuit may include a storage and processing circuit 110. The storage circuit in the storage and processing circuit 110 may be a memory, such as a hard disk drive memory, a non-volatile memory (e.g., a flash memory or other electronically programmable read-only memories for forming a solid state drive, etc.), a volatile memory (e.g., a static or dynamic random access memory (RAM), etc.), or the like. The disclosure is not limited thereto. The processing circuit in the storage and processing circuit 110 may be configured to control the operation of the electronic device 100. The processing circuit may be implemented based on one or more microprocessors, microcontrollers, digital master-slave earphone switching controllers, baseband processors, power management units, audio codec chips, application specific integrated circuits (ASICs), display driver integrated circuits, and the like.

The storage and processing circuit 110 can be configured to run software in the electronic device 100, such as an internet browsing application, a voice over internet protocol (VOIP) phone call application, an e-mail application, an application playing media files, an operating system function, and the like. The software may be configured to perform some control operations, such as image capturing based on a camera, ambient light measurement based on ambient light sensors, proximity sensor measurement based on proximity sensors, an information display function based on a status indicator such as a status indicator of a light emitting diode, touch event detection based on touch sensors, functions associated with displaying information on multiple (e.g., layered) displays, operations associated with performing wireless communication functions, operations associated with collecting and generating audio signals, control operations associated with the collecting and processing of button press event data, and other functions in the electronic device 100. The disclosure is not limited thereto.

The electronic device 100 further includes an input-output circuit 150. The input-output circuit 150 can be configured to enable the electronic device 100 to realize input and output of data, that is, to allow the electronic device 100 to receive data from external devices and to output data from the electronic device 100 to the external devices. The input-output circuit 150 may further include a sensor 170. The sensor 170 may include an ambient light sensor, an infrared proximity sensor based on light and capacitance, a touch sensor (e.g., a light-based touch sensor and/or capacitive touch sensor, where the touch sensor may be part of a touch screen or may be separate from the touch screen), an acceleration sensor, a gravity sensor, and other sensors.

The input-output circuit 150 may further include one or more displays, such as a display 130. The display 130 may include one or a combination of a liquid crystal display, an organic light emitting diode (OLED) display, an electronic ink display, a plasma display, and a display using other display technologies. The display 130 may include an array of touch sensors, i.e., the display 130 is a touch screen. The touch sensor may be a capacitive touch sensor formed by an array of transparent touch sensor electrodes, such as indium tin oxide (ITO) electrodes, or may be formed by adopting other touch technologies, such as sonic touch, pressure sensitive touch, resistive touch, optical touch, or the like. The disclosure is not limited thereto.

The input-output circuit 150 may further include an audio assembly 140. The audio assembly 140 may be configured to provide audio input and output functions for the electronic device 100. The audio assembly 140 in the electronic device 100 may include a speaker, a microphone, a buzzer, a tone generator, and other components for generating and detecting sound.

The input-output circuit 150 may further include a communication circuit 120. The communication circuit 120 may be configured to enable the electronic device 100 to communicate with the external devices. The communication circuit 120 may include an analog and digital input-output interface circuit, and a wireless communication circuit based on radio frequency signals and/or optical signals. The wireless communication circuit in the communication circuit 120 may include a radio frequency transceiver circuit, a power amplifier circuit, a low noise amplifier, a switch, a filter, and an antenna. For example, the wireless communication circuit in the communication circuit 120 may include a circuit for supporting near field communication (NFC) by transmitting and receiving near field coupled electromagnetic signals. The communication circuit 120 may include a near field communication antenna and a near field communication transceiver. The communication circuit 120 may further include a cellular phone transceiver circuit and antenna, or a wireless local area network transceiver circuit and antenna, or the like.

The electronic device 100 may further include a battery, a power management circuit, and other input-output units 160. The input-output units 160 may include buttons, joysticks, click wheels, scroll wheels, touch pads, keypads, keyboards, cameras, light emitting diodes, other status indicators, and the like.

The user may control the operation of the electronic device 100 by inputting commands through the input-output circuit 150, and receive status information and other outputs from the electronic device 100 by using the data output from the input-output circuit 150.

Figure 1B:
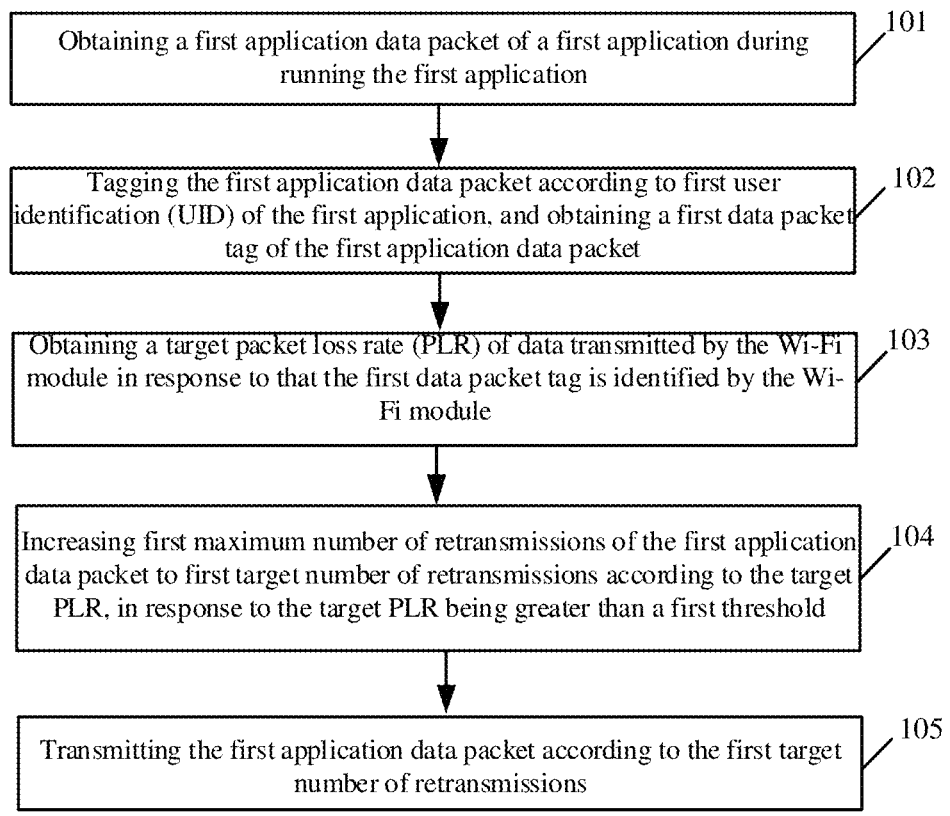
FIG. 1B is a schematic flow chart illustrating a method for data transmission according to implementations of the disclosure.

FIG. 1B is a schematic flow chart illustrating a method for data transmission according to implementations of the disclosure. The method is applicable to the electronic device illustrated in FIG. 1A. The electronic device includes a wireless-fidelity (Wi-Fi) module. The method begins at block 101.

At block 101, a first application data packet of a first application is obtained during running the first application.

The first application may include any of the following: a game application, a payment application, a chat application, a browser, or the like. In implementations of the disclosure, during running the first application, the first application may generate application data packets. For example, during running the game application of the electronic device, the game application may generate game application data packets. Alternatively, during running the payment application of the electronic device, the payment application may generate payment application data packets.

In at least one implementation, the method may further include the following. Determine whether the first application is in an application white list. When the first application is in the application white list, the first application data packet is tagged according to first user identification (UID) of the first application.

In one example, the application white list is set in advance. The application white list may include multiple applications such as a game application(s), a payment application(s), a chat application (s), a browser(s), and so on. The applications in the application white list can be preset by a user or set by default by the system.

At block 102, the first application data packet is tagged according to the first UID of the first application, and a first data packet tag of the first application data packet is obtained.

In an implementation of the disclosure, each application has corresponding UID. The UID is used for identifying a corresponding application. For example, when the electronic device identifies that the first application is a game application according to the first UID, the first application data packet can be tagged to obtain the first data packet tag for identifying the first application data packet. The first data packet tag may be identified by the Wi-Fi module.

At block 103, a target packet loss rate (PLR) of data transmitted by the Wi-Fi module is obtained in response to that the first data packet tag is identified by the Wi-Fi module.

Packet loss occurs when one or more data packets travelling across a computer network fail to reach their destination. Packet loss is either caused by errors in data transmission, typically across wireless networks, or network congestion. Packet loss is measured as a percentage of packets lost with respect to packets sent.

When the first application data packet of the first application needs to be transmitted, the Wi-Fi module can identify the first data packet tag. If the Wi-Fi module identifies that an application corresponding to the first data packet tag is in the white list, for example, if the Wi-Fi module identifies that the application corresponding to the first data packet tag is a game application, the target PLR of the data transmitted by the Wi-Fi module is obtained.

In at least one implementation, if the first application is a game application, a first transmission delay of a game application data packet is obtained during running of the game application. If the first transmission delay is longer than a first duration, the method proceeds to obtaining the target PLR of the data transmitted by the Wi-Fi module.

In one example, the game application data packet may be game data that the electronic device obtains from other devices (such as the game server) during running of the game application or the first application data packet. Therefore, the first transmission delay may be a transmission delay of the game data transmitted from other devices to the electronic device or an estimated transmission delay of the first application data packet accordingly.

The first duration is obtained according to experience. For example, the first duration is 100 ms.

In one example, if the first transmission delay is longer than the first duration, it can be determined that the game application cannot run smoothly, which may be caused by a relatively long transmission delay of a game application data packet due to the instability of the wireless network, such that the target PLR of the data transmitted by the Wi-Fi module can be obtained.

At block 104, when the target PLR is greater than a first threshold, first maximum number of retransmissions of the first application data packet is increased to first target number of retransmissions according to the target PLR.

The first maximum number of retransmissions refers to maximum number of times the electronic device can retransmit the first application data packet. In the implementations, it can determine whether the target PLR is greater than the first threshold. If the target PLR is greater than the first threshold, it indicates that the transmission delay of the first application data packet of the first application is relatively long, which may cause the first application to run unsmoothly. The first threshold is obtained according to experience. Therefore, in order to ensure that the first application data packet can be successfully transmitted, the first maximum number of retransmissions of the first application data packet can be increased according to the target PLR, thereby improving a success rate of transmitting the first application data packet by the electronic device.

In at least one implementation, the first maximum number of retransmissions of the first application data packet is increased to the first target number of retransmissions according to the target PLR as follows (i.e., the operations at block 104 include operations at block 41 and 42).

At block 41, the first target number of retransmissions corresponding to the target PLR is determined according to a preset corresponding relationship between PLRs and first maximum number of retransmissions.

At block 42, the first maximum number of retransmissions of the first application data packet is increased to the first target number of retransmissions.

In one example, the corresponding relationship between the PLRs and the first maximum number of retransmissions can be preset. For example, the following table illustrates a corresponding relationship between the packet loss rates (PLRs) and the first maximum number of retransmissions.

| Packet loss rate (PLR) | First maximum number of retransmissions |
| --- | --- |
| PLR > T1 | U1 |
| T1 > PLR > T2 | U2 |
| T2 > PLR > T3 | U3 |

In the table, T1, T2, and T3 represent PLRs, which can be adjusted according to measured data, and U1, U2, and U3 represent number of retransmissions, which can be determined according to a memory size of a chip of the electronic device.

In one example, the electronic device can determine the first target number of retransmissions (also referred to as target first maximum number of retransmissions) corresponding to the target PLR according to the above corresponding relationship, and then increase the first maximum number of retransmissions of the first application data packet to the first target number of retransmissions. For example, if the first maximum number of retransmissions of the first application data packet transmitted by the Wi-Fi module is initially determined to be 10 times, after the first target number of retransmissions is determined to be 15 times, the first maximum number of retransmissions may be increased to 15 times.

At block 105, the first application data packet is transmitted according to the first target number of retransmissions.

According to the method provided herein, the electronic device can transmit the first application data packet through the Wi-Fi module. In one example, for different first applications, the Wi-Fi module can transmit first application data packets to different external devices. For example, if the first application is a game application, the electronic device may send a game application data packet to an access network device, such that the access network device can send the game application data packet to a core network device, and then the core network device can send the game application data packet to a server. Therefore, data transmission between the electronic device and the server can be realized. For another example, if the first application is a payment application, the electronic device can send a payment application data packet to the server.

In one example, the first application is a game application, and the first application data packet is transmitted according to the first target number of retransmissions as follows (i.e., the operations at block 105 include operations at block 51 and 52).

At block 51, the first application data packet is transmitted to the access network device.

At block 52, when no first acknowledgement message indicative of successful transmission of the first application data packet is received within a first time period, the first application data packet is retransmitted to the access network device until a first acknowledgement message is received, where number of times of retransmitting the first application data packet to the access network device is less than or equal to the first target number of retransmissions.

Figure 1C:
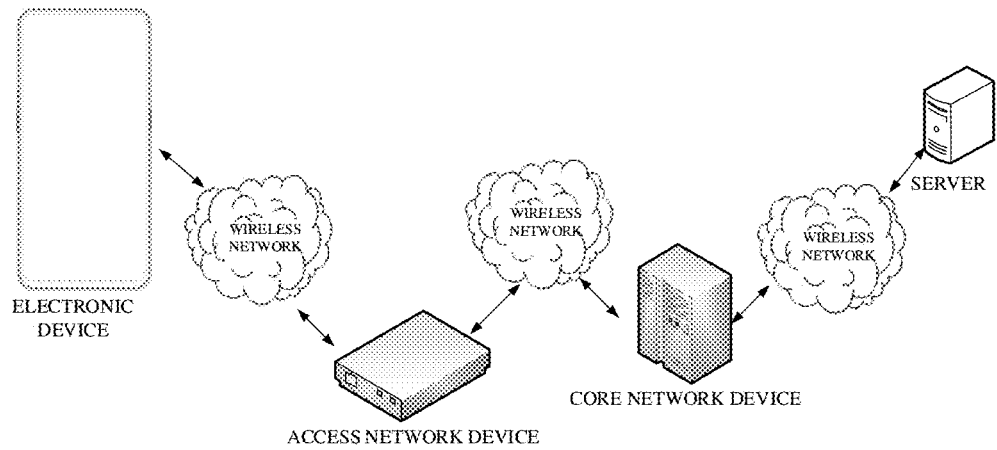
FIG. 1C illustrates a network architecture in which an electronic device transmits game application data packets according to implementations of the disclosure.

According to implementations, if the first application is the game application, the electronic device may transmit the game application data packet of the game application. FIG. 1C illustrates a network architecture in which the electronic device transmits game application data packets according to implementations of the disclosure. The electronic device can run a large-scale terminal game, such as a competitive played game. The electronic device can send the game application data packet to the access network device, such that the access network device can send the game application data packet to the core network device and then the core network device can send the game application data packet to the server. If the wireless network is not stable enough, during running of the game application, a game lag or slow in response may be caused due to a long transmission delay of the game application data packet, thereby affecting the game experience. Therefore, before the electronic device sends the first application data packet to the access network device, the first maximum number of retransmissions can be increased.

When the electronic device receives the first acknowledgement message indicative of successful transmission of the first application data packet, it may be determined that the first application data packet is successfully transmitted. If the electronic device does not receive the first acknowledgement message, the first application data packet can be retransmitted to the access network device until the first acknowledgement message is received. Furthermore, if the electronic device still does not receive the first acknowledgement message after the number of times of retransmitting the first application data packet to the access network device has reached the first target number of retransmissions, the electronic device does not continue to retransmit first application data packet, and determines that transmission of the first application data packet fails.

In at least one implementation, if a size (amount of data) of the first application data packet is greater than a second threshold, the first application data packet is retransmitted to the access network device as follows.

At A1, the first application data packet is divided into multiple application data sub-packets.

At A2, the multiple application data sub-packets are transmitted to the access network device according to a preset time interval.

When the electronic device retransmits the first application data packet, if the size of the first application packet is relatively large, the first application data packet may be divided into multiple application data sub-packets, and then the multiple application data sub-packets are sequentially retransmitted. In one example, the first data packet tag corresponding to the first application data packet can be added to a first application data sub-packet, such that messages indicative of successful transmission of the multiple application data sub-packets can be identified according to the first data packet tag.

In one example, the electronic device runs a second application while running the first application. The method further includes the following.

At B1, a second application data packet of the second application is tagged according to second UID of the second application, and a second data packet tag of the second application data packet is obtained.

At B2, when the second data packet tag is identified by the Wi-Fi module, second maximum number of retransmissions of the second application data packet transmitted by the Wi-Fi module is decreased to second target number of retransmissions according to the target PLR.

At B3, the second application data packet is transmitted according to the second target number of retransmissions.

In one example, the second application may include any of the following: a read application, a video playing application, an audio playing application, an application for synchronous backup, or other applications for transferring large files. The second maximum number of retransmissions refers to maximum number of times the Wi-Fi module can retransmit the second application data packet. In order to ensure that the first application data packet of the first application can be successfully transmitted, the second maximum number of retransmissions of the second application data packet transmitted by the Wi-Fi module can be reduced. For example, if the second maximum number of retransmissions of the second application data packet transmitted by the Wi-Fi module is initially determined to be 10 times, the second target number of retransmissions (also referred to as target second maximum number of retransmissions) corresponding to the target PLR can be determined according to the preset corresponding relationship between PLRs and second maximum number of retransmissions, for example, the second target number of retransmissions is determined to be 6 times, and thus the second maximum number of retransmissions can be reduced from 10 times to 6 times. That is, the maximum number of retransmissions is reduced when the Wi-Fi module transmits the second application data packet. When number of times the Wi-Fi module retransmits the second application data packet has reached the second target number of retransmissions, the retransmission ends, such that more network resources can be allocated to the first application data packet for transmitting the first application data packet, thereby reducing the transmission delay of the first application data packet.

In at least one implementation, it can be further determined whether the second application is in an application black list; if yes, the method proceeds to tagging the second application data packet of the second application according to the second UID of the second application.

In one example, the application black list can be set in advance. Applications in the application black list may include a read application, a video playing application, an audio playing application, an application for synchronous backup, or other applications for transferring large files. The applications in the application black list can be preset by a user or set by default by the system.

In at least one implementation, the following can be conducted after the first application data packet is transmitted according to the first target number of retransmissions.

A total transmission delay of the first application data packet is obtained.

The second application is closed on condition that the total transmission delay is longer than a second duration.

In the implementations, when the total transmission delay of the first application data packet is longer than the second duration, it indicates that the first application runs unsmoothly, which may affect user experience. The second duration is obtained according to experience. For example, the second duration is 200 ms. Therefore, the second application can be closed, and the transmission of the second application data packet may be stopped, such that a success rate of the transmission of the first application data packet may be improved and the transmission delay of the first application data packet can be reduced, thereby ensuring smooth running of the first application.

According to the method for data transmission provided herein, the first application data packet of the first application is obtained during running the first application. The first application data packet is tagged according to the first UID of the first application, and the first data packet tag of the first application data packet is obtained. The target PLR of the data transmitted by the Wi-Fi module is obtained in response to that the first data packet tag is identified by the Wi-Fi module. When the target PLR is greater than the first threshold, the first maximum number of retransmissions of the first application data packet is increased to the first target number of retransmissions according to the target PLR. The first application data packet is transmitted according to the first target number of retransmissions. In this way, it is possible to increase the success rate that the electronic device transmits the first application data packet by increasing the first maximum number of retransmissions of the first application data packet transmitted by the Wi-Fi module, and thus there is no need to trigger an upper layer retransmission mechanism, thereby greatly reducing the transmission delay of the first application data packet and avoiding affecting the running of the first application due to the instability of the wireless network.

Figure 2:
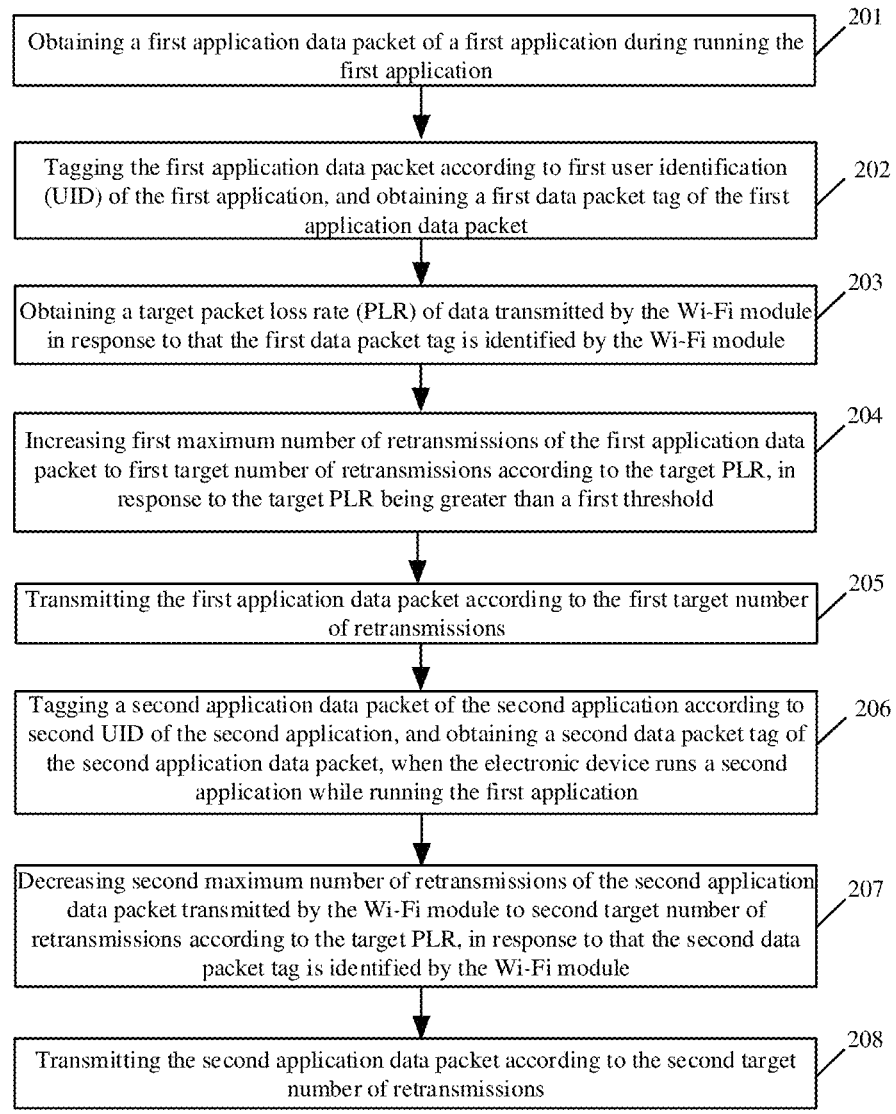
FIG. 2 is a schematic flow chart illustrating a method for data transmission according to other implementations of the disclosure.

Similar to the implementations illustrated in FIG. 1B, FIG. 2 is a schematic flow chart illustrating a method for data transmission according to other implementations of the disclosure. The method is applicable to an electronic device including a Wi-Fi module. The method begins at block 201.

At block 201, a first application data packet of a first application is obtained during running the first application.

At block 202, the first application data packet is tagged according to first UID of the first application, and a first data packet tag of the first application data packet is obtained.

At block 203, a target PLR of data transmitted by the Wi-Fi module is obtained when the first data packet tag is identified by the Wi-Fi module.

At block 204, when the PLR is greater than a first threshold, first maximum number of retransmissions of the first application data packet is increased to first target number of retransmissions according to the target PLR.

At block 205, the first application data packet is transmitted according to the first target number of retransmissions.

At block 206, when the electronic device runs a second application while running the first application, a second application data packet of the second application is tagged according to second UID of the second application, and a second data packet tag of the second application data packet is obtained.

At block 207, when the second data packet tag is identified by the Wi-Fi module, second maximum number of retransmissions of the second application data packet transmitted by the Wi-Fi module is decreased to second target number of retransmissions according to the target PLR.

At block 208, the second application data packet is transmitted according to the second target number of retransmissions.

For the detailed description of the above operations at block 201 to 208, reference may be made to the corresponding description of the method for data transmission described in FIG. 1B, which will not be repeated herein.

As can be seen, in the method for data transmission, during running the first application, the first application data packet of the first application is obtained. The first application data packet is tagged according to the first UID of the first application, and the first data packet tag of the first application data packet is obtained. The target PLR of the data transmitted by the Wi-Fi module is obtained in response to that the first data packet tag is identified by the Wi-Fi module. When the target PLR is greater than the first threshold, the first maximum number of retransmissions of the first application data packet is increased to the first target number of retransmissions according to the target PLR, and the first application data packet is transmitted according to the first target number of retransmissions. In addition, the second maximum number of retransmissions of the second application data packet transmitted by the Wi-Fi module is decreased to the second target number of retransmissions according to the target PLR, and the second application data packet is transmitted according to the second target number of retransmissions. In this way, it is possible to increase the success rate that the electronic device transmits the first application data packet by increasing the first maximum number of retransmissions of the first application data packet transmitted by the Wi-Fi module and decreasing the second maximum number of retransmissions of the second application data packet transmitted by the Wi-Fi module, and thus there is no need to trigger the upper layer retransmission mechanism, thereby greatly reducing transmission delay of the first application data packet and avoiding affecting the running of the first application due to the instability of the wireless network.

Figure 3:
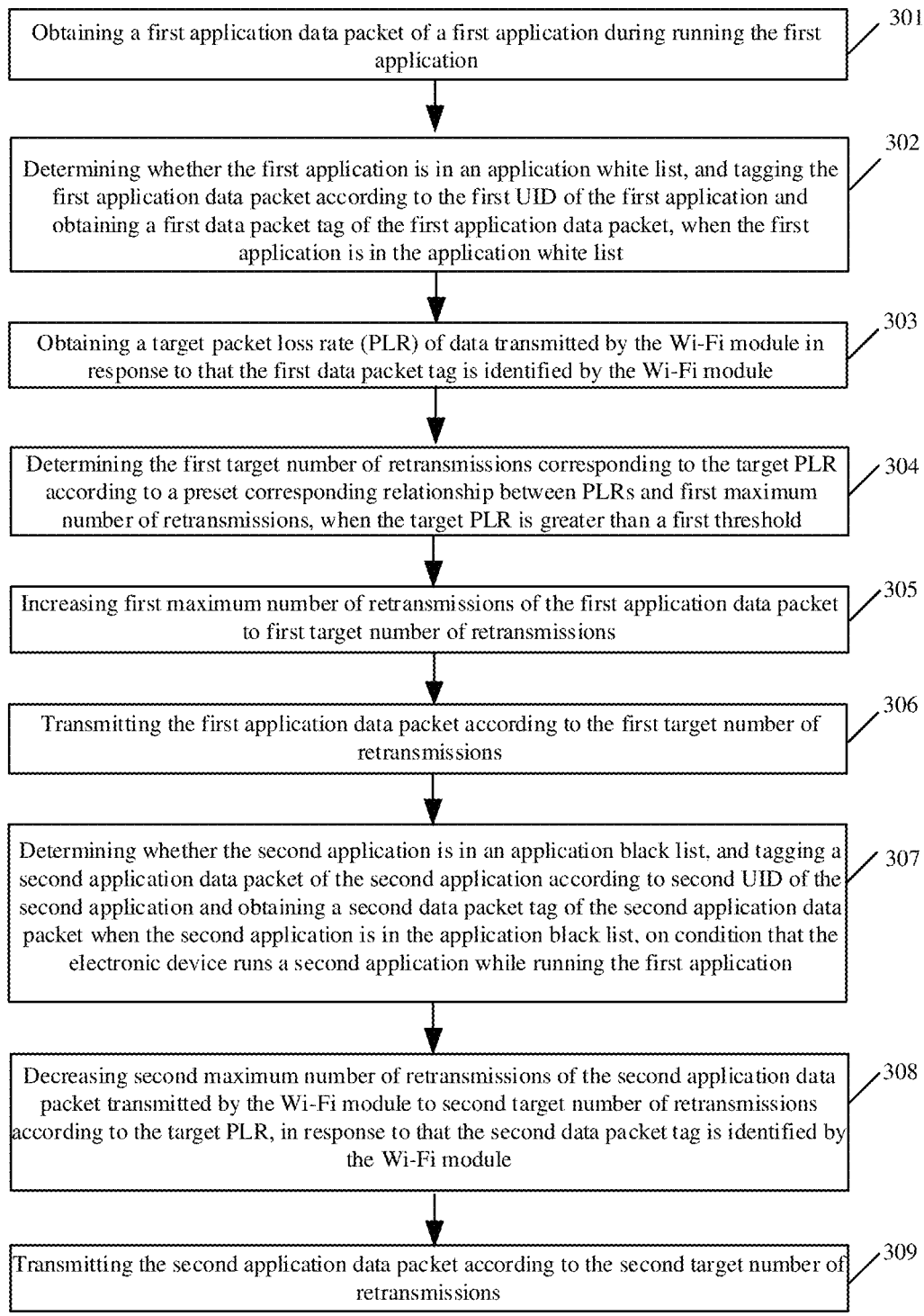
FIG. 3 is a schematic flow chart illustrating a method for data transmission according to other implementations of the disclosure.

Similar to the foregoing method, FIG. 3 is a schematic flow chart illustrating a method for data transmission according to other implementations of the disclosure. The method is applicable to the electronic device illustrated in FIG. 1A, and the electronic device includes a Wi-Fi module. The method begins at block 301.

At block 301, a first application data packet of a first application is obtained during running the first application.

At block 302, determine whether the first application is in an application white list, and when the first application is in the application white list, the first application data packet is tagged according to first UID of the first application, and a first data packet tag of the first application data packet is obtained.

At block 303, a target PLR of data transmitted by the Wi-Fi module is obtained when the first data packet tag is identified by the Wi-Fi module.

At block 304, when the target PLR is greater than a first threshold, the first target number of retransmissions corresponding to the target PLR is determined according to a preset corresponding relationship between PLRs and first maximum number of retransmissions.

At block 305, the first maximum number of retransmissions of the first application data packet is increased to first target number of retransmissions.

At block 306, the first application data packet is transmitted according to the first target number of retransmissions.

At block 307, when the electronic device runs a second application while running the first application, determine whether the second application is in an application black list, and when the second application is in the application black list, a second application data packet of the second application is tagged according to second UID of the second application, and a second data packet tag of the second application data packet is obtained.

At block 308, when the second data packet tag is identified by the Wi-Fi module, second maximum number of retransmissions of the second application data packet transmitted by the Wi-Fi module is decreased to second target number of retransmissions according to the target PLR.

At block 309, the second application data packet is transmitted according to the second target number of retransmissions.

For the detailed description of the above operations at block 301 to 309, reference may be made to the corresponding description of the method for data transmission described in FIG. 1B, which will not be repeated herein.

As can be seen, in the method for data transmission, during running the first application, the first application data packet of the first application is obtained. Determine whether the first application is in the application white list; if the first application is in the application white list, the first application data packet is tagged according to the first UID of the first application, and the first data packet tag of the first application data packet is obtained. The target PLR of the data transmitted by the Wi-Fi module is obtained when the first data packet tag is identified by the Wi-Fi module. When the target PLR is greater than the first threshold, the first maximum number of retransmissions of the first application data packet is increased to the first target number of retransmissions according to the target PLR, and the first application data packet is transmitted according to the first target number of retransmissions. In addition, the second maximum number of retransmissions of the second application data packet transmitted by the Wi-Fi module is decreased to the second target number of retransmissions according to the target PLR, and the second application data packet is transmitted according to the second target number of retransmissions. In this way, it is possible to increase the success rate that the electronic device transmits the first application data packet by increasing the first maximum number of retransmissions of the first application data packet transmitted by the Wi-Fi module and decreasing the maximum number of retransmissions of the second application data packet transmitted by the Wi-Fi module, and thus there is no need to trigger the upper layer retransmission mechanism, thereby greatly reducing transmission delay of the first application data packet and avoiding affecting the running of the first application due to the instability of the wireless network.

The following is a device for implementing the above method for data transmission. The details are as follows.

Figure 4:
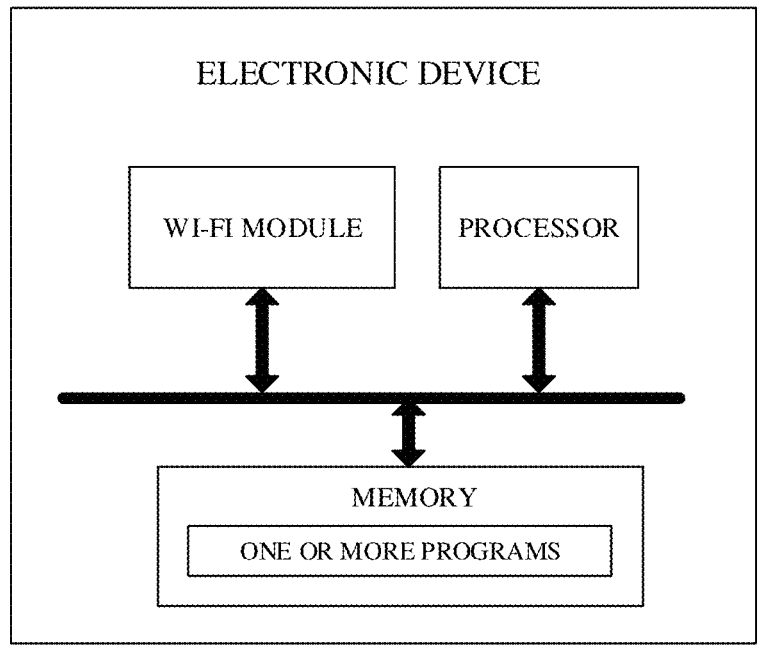
FIG. 4 is a schematic structural diagram illustrating an electronic device according to other implementations of the disclosure.

Similar to the above implementations, FIG. 4 is a schematic structural diagram illustrating an electronic device according to other implementations of the disclosure. As illustrated in FIG. 4, the electronic device includes a processor, a memory, and one or more programs. The one or more programs are stored in the memory and configured to be performed by the processor. The one or more programs include instructions for performing the following operations. A first application data packet of a first application is obtained during running the first application. The first application data packet is tagged according to first UID of the first application, and a first data packet tag of the first application data packet is obtained. A target PLR of data transmitted by the Wi-Fi module is obtained in response to that the first data packet tag is identified by the Wi-Fi module. When the target PLR is greater than a first threshold, first maximum number of retransmissions of the first application data packet is increased to first target number of retransmissions according to the target PLR. The first application data packet is transmitted according to the first target number of retransmissions.

In one example, instructions of the one or more programs are further configured to: determine whether the first application is in an application white list; proceed to tagging the first application data packet according to the first UID of the first application, in response to determining that the first application is in the application white list.

In one example, in terms of increasing, according to the target PLR, the first maximum number of retransmissions of the first application data packet to the first target number of retransmissions, instructions of the one or more programs are configured to: determine the first target number of retransmissions corresponding to the target PLR according to a preset corresponding relationship between PLRs and first maximum number of retransmissions; increase the first maximum number of retransmissions of the first application data packet to the first target number of retransmissions.

In one example, the first application is a game application, and in terms of transmitting the first application data packet according to the first target number of retransmissions, instructions of the one or more programs are configured to: transmit the first application data packet to an access network device; retransmit the first application data packet to the access network device until a first acknowledgement message indicative of successful transmission of the first application data packet is received, in response to that no first acknowledgement message is received within a first time period, where number of times of retransmitting the first application data packet to the access network device is less than or equal to the first target number of retransmissions.

In one example, a size of the first application data packet is greater than a second threshold, and in terms of retransmitting the first application data packet to the access network device, instructions of the one or more programs are configured to: divide the first application data packet into multiple application data sub-packets; retransmit the multiple application data sub-packets to the access network device according to a preset time interval.

In one example, instructions of the one or more programs are further configured to: obtain a first transmission delay of a game application data packet during running of the game application, and proceed to obtaining the target PLR of the data transmitted by the Wi-Fi module on condition that the first transmission delay is longer than a first duration.

In one example, the electronic device runs a second application while running the first application, and instructions of the one or more programs are further configured to: tag a second application data packet of the second application according to second UID of the second application, and obtain a second data packet tag of the second application data packet; decrease, according to the target PLR, second maximum number of retransmissions of the second application data packet transmitted by the Wi-Fi module to second target number of retransmissions, in response to that the second data packet tag is identified by the Wi-Fi module; transmit the second application data packet according to the second target number of retransmissions.

In one example, instructions of the one or more programs are further configured to: determine whether the second application is in an application black list; proceed to tagging the second application data packet of the second application according to the second UID of the second application, in response to determining that the second application is in the application black list.

In one example, after transmitting the first application data packet according to the first target number of retransmissions, instructions of the one or more programs are further configured to: obtain a total transmission delay of the first application data packet; close the second application, on condition that the total transmission delay is longer than a second duration.

Figure 5A:
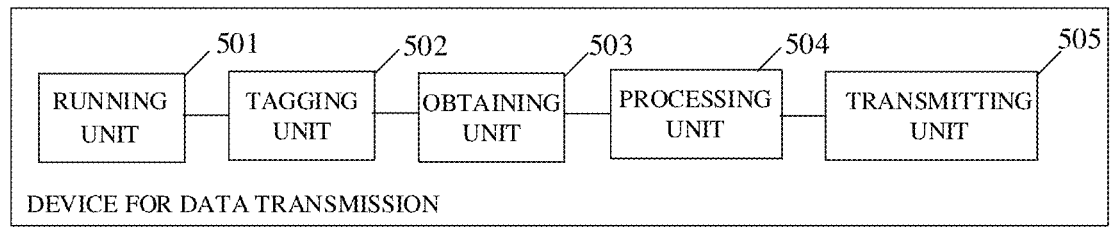
FIG. 5A is a schematic structural diagram illustrating a device for data transmission according to implementations of the disclosure.

FIG. 5A is a schematic structural diagram illustrating a device for data transmission according to implementations of the disclosure. The device is applicable to the electronic device illustrated in FIG. 1A. The electronic device includes a Wi-Fi module. The device includes a running unit 501, a tagging unit 502, an obtaining unit 503, a processing unit 504, and a transmitting unit 505.

The running unit 501 is configured to obtain a first application data packet of a first application during running the first application.

The tagging unit 502 is configured to tag the first application data packet according to first UID of the first application, and obtain a first data packet tag of the first application data packet.

The obtaining unit 503 is configured to obtain a target PLR of data transmitted by the Wi-Fi module in response to that the first data packet tag is identified by the Wi-Fi module.

The processing unit 504 is configured to increase, according to the target PLR, first maximum number of retransmissions of the first application data packet to first target number of retransmissions, on condition that the target PLR is greater than a first threshold.

The transmitting unit 505 is configured to transmit the first application data packet according to the first target number of retransmissions.

Figure 5B:
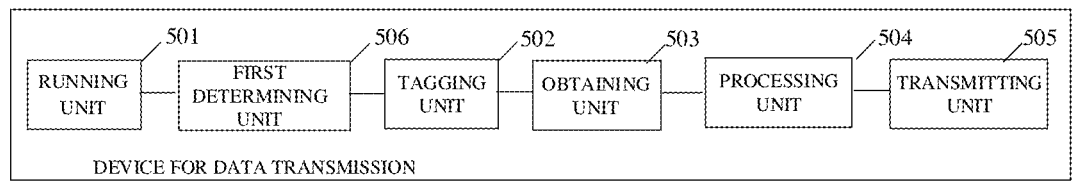
FIG. 5B is a variant of a device for data transmission illustrated in FIG. 5A according to other implementations of the disclosure.

FIG. 5B is a variant of a device for data transmission illustrated in FIG. 5A according to other implementations of the disclosure. Compared to the device for data transmission illustrated in FIG. 5A, the device for data transmission in FIG. 5B further includes a first determining unit 506.

The first determining unit 506 is configured to determine whether the first application is in an application white list, and the tagging unit 502 is configured to proceed to tagging the first application data packet according to the first UID of the first application, when the first determining unit 506 determines that the first application is in the application white list.

In at least one implementation, the processing unit 504 configured to increase, according to the target PLR, the first maximum number of retransmissions of the first application data packet to the first target number of retransmissions is configured to: determine the first target number of retransmissions corresponding to the target PLR according to a preset corresponding relationship between PLRs and the first maximum number of retransmissions; increase the first maximum number of retransmissions of the first application data packet to the first target number of retransmissions.

In at least one implementation, the first application is a game application, and the transmitting unit 505 configured to transmit the first application data packet according to the first target number of retransmissions is configured to: transmit the first application data packet to an access network device; retransmit the first application data packet to the access network device until a first acknowledgement message indicative of successful transmission of the first application data packet is received, in response to that no first acknowledgement message is received within a first time period, where number of times of retransmitting the first application data packet to the access network device is less than or equal to the first target number of retransmissions.

In at least one implementation, a size of the first application data packet is greater than a second threshold, and the transmitting unit 505 configured to retransmit the first application data packet to the access network device is configured to: divide the first application data packet into multiple application data sub-packets; retransmit the multiple application data sub-packets to the access network device according to a preset time interval.

In at least one implementation, the obtaining unit 503 is further configured to: obtain a first transmission delay of a game application data packet during running of the game application; proceed to obtaining the target PLR of the data transmitted by the Wi-Fi module on condition that the first transmission delay is longer than a first duration.

In at least one implementation, the electronic device runs a second application while running the first application, the tagging unit 502 is further configured to tag a second application data packet of the second application according to second UID of the second application, and obtain a second data packet tag of the second application data packet. The processing unit 504 is further configured to decrease, according to the target PLR, second maximum number of retransmissions of the second application data packet transmitted by the Wi-Fi module to second target number of retransmissions, in response to that the second data packet tag is identified by the Wi-Fi module. The transmitting unit 505 is further configured to transmit the second application data packet according to the second target number of retransmissions.

Figure 5C:
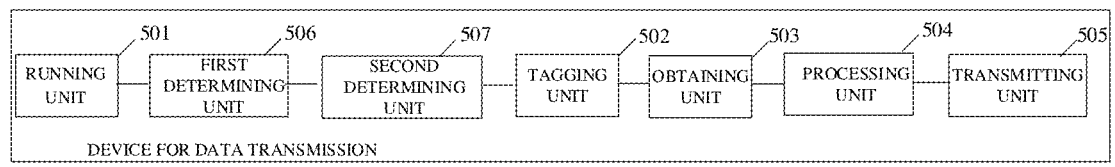
FIG. 5C is a variant of a device for data transmission illustrated in FIG. 5A or FIG. 5B according to other implementations of the disclosure.

FIG. 5C is a variant of a device for data transmission illustrated in FIG. 5A or FIG. 5B according to other implementations of the disclosure. Compared to the device for data transmission illustrated in FIG. 5A, the device for data transmission in FIG. 5B further includes a second determining unit 507. The second determining unit 507 is configured to: determine whether the second application is in an application black list, and the tagging unit 502 is configured to proceed to tagging the second application data packet of the second application according to the second UID of the second application, when the second determining unit 507 determines that the second application is in the application black list.

In at least one implementation, the obtaining unit 503 is further configured to obtain a total transmission delay of the first application data packet and the processing unit 504 is further configured to close the second application, on condition that the total transmission delay is longer than a second duration, after the transmitting unit 505 transmits the first application data packet according to the first target number of retransmissions.

According to the device for data transmission provided herein, the first application data packet of the first application is obtained during running the first application. The first application data packet is tagged according to the first UID of the first application, and the first data packet tag of the first application data packet is obtained. The target PLR of the data transmitted by the Wi-Fi module is obtained in response to that the first data packet tag is identified by the Wi-Fi module. When the target PLR is greater than the first threshold, the first maximum number of retransmissions of the first application data packet is increased to the first target number of retransmissions according to the target PLR. The first application data packet is transmitted according to the first target number of retransmissions. In this way, it is possible to increase the success rate that the electronic device transmits the first application data packet by increasing the first maximum number of retransmissions of the first application data packet transmitted by the Wi-Fi module, and thus there is no need to trigger the upper layer retransmission mechanism, thereby greatly reducing transmission delay of the first application data packet and avoiding affecting the running of the first application due to the instability of the wireless network.

It can be understood that the functions of the program modules of the device for data transmission in the implementation can be implemented according to the method in the above method implementations, and the specific implementation process can be referred to the relevant description of the above method implementations, which are not be repeated herein.

Implementations of the disclosure also provide a non-transitory computer readable storage medium. The non-transitory computer readable storage medium stores computer programs for electronic data interchange which, when executed, are operable with a computer to perform all or part of the operations of any of the methods for data transmission described in the above-described method implementations.

Implementations of the disclosure also provide a computer program product. The computer program product includes a non-transitory computer readable storage medium storing computer programs. The computer programs are operable with a computer to perform all or part of the operations of any of the methods for data transmission described in the above method implementations.

It is to be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the disclosure. The memory includes various medium capable of storing program codes, such as a universal serial bus (USB) flash disk, a read-only memory (ROM), a RAM, a removable hard disk, a disk, a CD, or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the disclosure in detail. The principle and implementations of the disclosure are illustrated by specific examples. The illustration of the above implementations is merely used to facilitate understanding of the methods and core concept of the disclosure. For a person skilled in the art, according to the concept of the disclosure, specific implementations and application ranges may be both changed. Based on the above, the disclosure shall not be understood to be limited to the specification.

What is claimed is:

1. A method for data transmission for an electronic device comprising a wireless-fidelity (Wi-Fi) module, the method comprising:
    obtaining a first application data packet of a first application during running the first application, wherein the first application is a game application;
    tagging the first application data packet according to first user identification (UID) of the first application, and obtaining a first data packet tag of the first application data packet;
    obtaining a target packet loss rate (PLR) of data transmitted by the Wi-Fi module in response to that the first data packet tag is identified by the Wi-Fi module;
    increasing first maximum number of retransmissions of the first application data packet to first target number of retransmissions according to the target PLR, in response to the target PLR being greater than a first threshold; and
    transmitting the first application data packet according to the first target number of retransmissions, comprising:
        transmitting the first application data packet to an access network device; and
        retransmitting the first application data packet to the access network device until receiving a first acknowledgement message indicative of successful transmission of the first application data packet, in response to that not receiving the first acknowledgement message within a first time period, wherein number of times of retransmitting the first application data packet to the access network device is less than or equal to the first target number of retransmissions;
    wherein a size of the first application data packet is greater than a second threshold, and retransmitting the first application data packet to the access network device comprises:
        dividing the first application data packet into a plurality of application data sub-packets; and
        retransmitting the plurality of application data sub-packets to the access network device according to a preset time interval.

2. The method of claim 1, wherein tagging the first application data packet according to the first UID of the first application comprises:
    tagging the first application data packet according to the first UID of the first application in response to determining that the first application is in an application white list.

3. The method of claim 1, wherein increasing the first maximum number of retransmissions of the first application data packet to the first target number of retransmissions according to the target PLR comprises:
    determining the first target number of retransmissions corresponding to the target PLR according to a preset corresponding relationship between PLRs and first maximum number of retransmissions; and
    increasing the first maximum number of retransmissions of the first application data packet to the first target number of retransmissions.

4. The method of claim 1, further comprising:
    obtaining a first transmission delay of a game application data packet during running the game application; and
    obtaining the target PLR of the data transmitted by the Wi-Fi module in response to the first transmission delay being longer than a first duration.

5. The method of claim 1, wherein the electronic device runs a second application while running the first application, and the method further comprises:
    tagging a second application data packet of the second application according to second UID of the second application, and obtaining a second data packet tag of the second application data packet;
    decreasing second maximum number of retransmissions of the second application data packet transmitted by the Wi-Fi module to second target number of retransmissions according to the target PLR, in response to that the second data packet tag is identified by the Wi-Fi module; and
    transmitting the second application data packet according to the second target number of retransmissions.

6. The method of claim 5, wherein tagging the second application data packet of the second application according to the second UID of the second application comprises:
    tagging the second application data packet of the second application according to the second UID of the second application in response to determining that the second application is in an application black list.

7. The method of claim 5, further comprising:
    after transmitting the first application data packet according to the first target number of retransmissions,
        obtaining a total transmission delay of the first application data packet; and
        closing the second application in response to the total transmission delay being longer than a second duration.

8. An electronic device, comprising:
a processor;
a wireless-fidelity (Wi-Fi) module coupled to the processor; and
a memory coupled to the processor and storing one or more programs;
the one or more programs which, when executed by the processor, cause the processor to:
obtain a first application data packet of a first application of the electronic device during running the first application, wherein the first application is a game application;
tag the first application data packet according to first user identification (UID) of the first application, and obtain a first data packet tag of the first application data packet;
obtain a target PLR of data transmitted by the Wi-Fi module in response to that the first data packet tag is identified by the Wi-Fi module;
increase first maximum number of retransmissions of the first application data packet to first target number of retransmissions according to the target PLR, in response to the target PLR being greater than a first threshold; and
transmit the first application data packet according to the first target number of retransmissions, comprising:
transmit the first application data packet to an access network device; and
retransmit the first application data packet to the access network device until receiving a first acknowledgement message indicative of successful transmission of the first application data packet, in response to that not receiving the first acknowledgement message within a first time period, wherein number of times of retransmitting the first application data packet to the access network device is less than or equal to the first target number of retransmissions;
wherein a size of the first application data packet is greater than a second threshold, and retransmit the first application data packet to the access network device comprises:
divide the first application data packet into a plurality of application data sub-packets; and
retransmit the plurality of application data sub-packets to the access network device according to a preset time interval.

9. The electronic device of claim 8, wherein the one or more programs executed by the processor to tag the first application data packet according to the first UID of the first application are executed by the processor to:
tag the first application data packet according to the first UID of the first application, in response to determining that the first application is in an application white list.

10. The electronic device of claim 8, wherein the one or more programs executed by the processor to increase the first maximum number of retransmissions of the first application data packet to the first target number of retransmissions according to the target PLR are executed by the processor to:
determine the first target number of retransmissions corresponding to the target PLR according to a preset corresponding relationship between PLRs and the first maximum number of retransmissions; and
increase the first maximum number of retransmissions of the first application data packet to the first target number of retransmissions.

11. The electronic device of claim 8, wherein the one or more programs, when executed by the processor, further cause the processor to:
obtain a first transmission delay of a game application data packet during running of the game application; and
obtain the target PLR of the data transmitted by the Wi-Fi module in response to the first transmission delay being longer than a first duration.

12. The electronic device of claim 8, wherein the electronic device runs a second application while running the first application, wherein one or more programs, when executed by the processor, further cause the processor to:
tag a second application data packet of the second application according to second UID of the second application, and obtaining a second data packet tag of the second application data packet;
decrease second maximum number of retransmissions of the second application data packet transmitted by the Wi-Fi module to second target number of retransmissions according to the target PLR, in response to that the second data packet tag is identified by the Wi-Fi module; and
transmit the second application data packet according to the second target number of retransmissions.

13. The electronic device of claim 12, wherein the one or more programs executed by the processor to tag the second application data packet of the second application according to the second UID of the second application are executed by the processor to:
tag the second application data packet of the second application according to the second UID of the second application, in response to determining that the second application is in an application black list.

14. The electronic device of claim 12, wherein one or more programs, when executed by the processor, further cause the processor to:
after transmitting the first application data packet according to the first target number of retransmissions,
obtain a total transmission delay of the first application data packet; and
close the second application, in response to the total transmission delay being longer than a second duration.

15. A non-transitory computer readable storage medium storing computer programs, wherein the computer programs, when executed by a processor, cause the processor to:
obtain a first application data packet of a first application during running the first application of an electronic device, wherein the first application is a game application;
tag the first application data packet according to first user identification (UID) of the first application, and obtain a first data packet tag of the first application data packet;
obtain a target PLR of data transmitted by a Wi-Fi module in response to that the first data packet tag is identified by the Wi-Fi module;
increase first maximum number of retransmissions of the first application data packet to first target number of retransmissions according to the target PLR, in response to the target PLR being greater than a first threshold; and transmit the first application data packet according to the first target number of retransmissions, comprising:
  transmit the first application data packet to an access network device; and
  retransmit the first application data packet to the access network device until receiving a first acknowledgement message indicative of successful transmission of the first application data packet, in response to that not receiving the first acknowledgement message within a first time period, wherein number of times of retransmitting the first application data packet to the access network device is less than or equal to the first target number of retransmissions;
wherein a size of the first application data packet is greater than a second threshold, and retransmit the first application data packet to the access network device, the computer programs comprises:
  divide the first application data packet into a plurality of application data sub-packets; and
  retransmit the plurality of application data sub-packets to the access network device according to a preset time interval.

\* \* \* \* \*